(No Model.)
M. V. TEETOR.
LIQUID DISPENSING APPARATUS.
No. 563,212. Patented June 30, 1896.
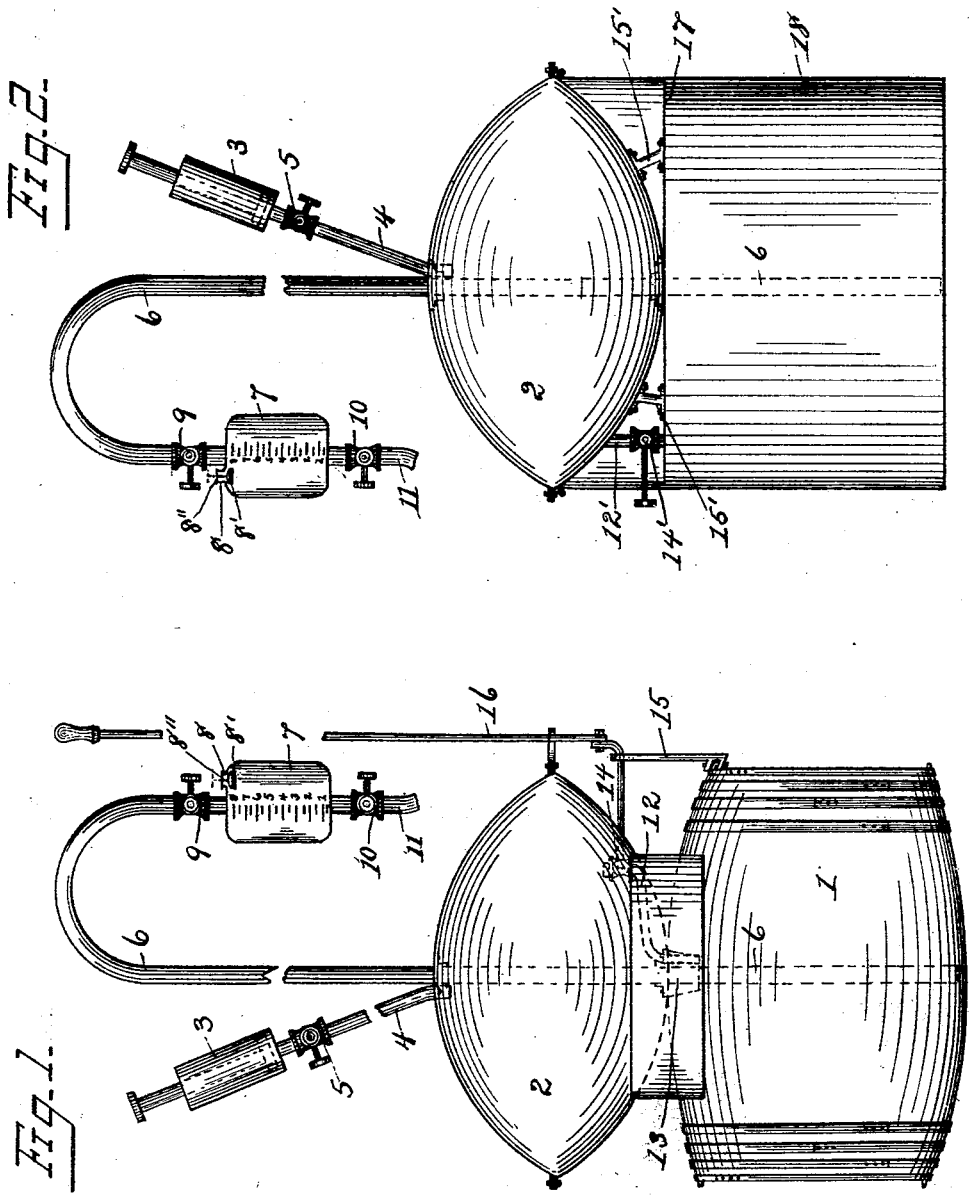
Witnesses
Albert Popkins
Frank D. Blackistone
Inventor
Martin V. Teetor
by
Benj. R. Catlin Attorney

UNITED STATES PATENT OFFICE.

MARTIN V. TEETOR, OF SODUS, NEW YORK.

LIQUID-DISPENSING APPARATUS.

SPECIFICATION forming part of Letters Patent No. 563,212, dated June 30, 1896.

Application filed August 13, 1895. Serial No. 559,169. (No model.)

*To all whom it may concern:*

Be it known that I, MARTIN V. TEETOR, a resident of Sodus, in the county of Wayne and State of New York, have invented certain new and useful Improvements in Liquid-Dispensing Apparatus; and I do hereby declare the following to be a full, clear, and exact description of the invention, such as will enable others skilled in the art to which it pertains to make and use the same.

The invention relates to measuring and dispensing liquids and to apparatus for raising oil or other liquid from a barrel, tank, or like receptacle situated at a distance from the point of distribution, as, for example, in a cellar or outhouse. Its object is to simplify devices of this character so far as consistent with efficiency and convenience of operation, and to adapt them for use with various receptacles.

The invention consists in the construction hereinafter described and particularly pointed out.

In the accompanying drawings, Figure 1 is an elevation of the apparatus. Fig. 2 is an elevation showing a modification.

Numeral 1 denotes a barrel, and 2 a receptacle or holder for air under pressure. This is preferably made of a flattened ovoid form.

3 indicates an air-pump or equivalent to force air into the holder. It communicates with the interior of the holder by a pipe 4, having a cock 5.

6 denotes a pipe opening near the bottom of the liquid-receptacle and communicating at its opposite end with a translucent measuring vessel 7, suitably marked with a scale of measures and provided with an air-valve 8. This valve is adapted to be closed by a float 8', which may at times be pendent from a perforated cap 8", connected therewith and adapted to rest on the top of the air-valve tube.

The pipe 6 is bent near its upper end, as indicated, and attached to the top of the measuring vessel. 9 and 10 denote cocks above and below said vessel, respectively, the latter being situated in a delivery-pipe 11.

The pipe 6 is centrally situated as respects the air-holder and is rigidly secured to both its upper and lower walls by packed couplings or stuffing-boxes, the object of the construction being to make air-tight joints and also to provide a stay for the walls of the air-holder to strengthen it to resist air-pressure.

12 indicates an air-pipe by which the air-holder and the main liquid-receptacle may be made to communicate at will. As represented in Fig. 1, the discharge end of this pipe is connected with a hollow plug or bung 13, adapted to fit the bung-hole of an ordinary barrel. Through this bung the pipe 6 is also passed. The construction is such that the device can be applied to casks or barrels of usual construction without change in either.

14 denotes a cock in pipe 12, and 15 is a stay or clamp by which, if desired, it may be supported from the barrel.

16 denotes an air-cock-controlling rod suitably connected to the handle or plug of the cock 14, and extending to the vicinity of the measuring vessel, by which rod the cock can be opened and closed from a distance, if desired.

In the form shown in Fig. 2, 17 denotes the sunken cover or upper horizontal wall of a tank, and 18 its exterior vertical wall. The air-reservoir communicates with the tank through a pipe 12', having a cock 14', and 15' indicates a stay or strut placed oppositely to pipe 12'.

The apparatus being suitably attached to a barrel or tank filled with oil or other liquid and situated, for example, in a cellar, the pump and measuring vessel being in a room above and connected to communicate, respectively, with the air and liquid holders, may be operated by forcing air into the air-holder and thence into the liquid-holder, thereby depressing the liquid in its holder and filling the measuring vessel, the air-vent and all the cocks except cock 10 being open. The measuring vessel having been filled and cock 9 closed, liquid can be drawn from the vessel 7 in measured quantity, as indicated by the scale. All the cocks being closed except that in the pump-pipe, air can be compressed in the air-holder and there held in readiness to fill the measuring vessel without further use of the pump. By this means pumping can be done at leisure, or at a convenient time, sufficient to fill the measuring vessel with liquid several times.

To obviate the danger of leakage from the barrel or tank, the cock 14 can be kept closed, except when air-pressure above the normal is desired to raise oil to the measuring vessel. This cock can be controlled from the vicinity of the dispensing vessel by means of the rod 16, as above stated.

The pump is preferably situated in the cellar or other place where the barrel is, though obviously this is not essential. It is, however, an object of the air-holder to provide that the pump may be conveniently placed at a distance from the dispensing vessel and preferably near the barrel or tank, since it avoids a frequent use of the pump, as would otherwise be necessary, and therefore avoids frequency of trips to the storage-room for the purpose of pumping.

I am aware that pumps have been combined with liquid-receptacles and with measuring vessels, and also that air-reservoirs have been used in liquid-dispensing apparatus, and do not claim such matters broadly. My improvement is characterized by a special construction and arrangement, as hereinafter pointed out, in an apparatus adapted to be manipulated at a distance from the liquid-reservoir, the devices being applicable directly to an ordinary cask or barrel and the air-reservoir and valve-rod supported thereon and the various parts arranged immediately over the cask and connected, all as specified, whereby compactness, simplicity, economy, and convenience of operation are secured. Further, the improvement contemplates an air-holder of approximately-ovoid form, having its oblate sides rigidly held together by the liquid-service pipe and also having a plug or stuffing-box of the air-vessel adapted to be used as a bung for a cask or the like, and as a medium for the introduction of the service-pipe into said cask. The air vessel is seated directly upon and fixed to the liquid-holder on its top and the air-valve rod is also supported from the holder, said rod and pump and liquid-pipes being preferably extended directly to the room where the liquid is dispensed.

Having thus fully described my invention, what I claim is—

1. The combination of the measuring vessel, pump, air-holder, liquid-holder and suitable cocks and pipes including a pipe 6 for liquid, whereby the air-holder can be filled with air and the air held under pressure at will, and the measuring vessel repeatedly filled without renewed pumping, said pump being situated near the measuring vessel and at a distance from the liquid-holder and said air and liquid holders communicating by an air-pipe provided with a cock, the former having stuffing-boxes perforated for the passage of the air and liquid pipes and one of said stuffing-boxes constituting a bung for the liquid-holder, substantially as set forth.

2. The combination of a liquid-holder, an ovoid air-holder seated on top of the liquid-holder and connected therewith by a pipe provided with a cock, an air-pump and a measuring vessel communicating with the lower part of the liquid-holder by a pipe 6, said pipe passing through the air-holder and rigidly fixed to its opposite oblate walls to strengthen the same and fixed to the liquid-holder to hold it in place thereon, substantially as set forth.

3. The combination of a liquid-holder, an air-holder, an air-pump, a measuring vessel, pipes whereby the pump communicates with the air-holder and the measuring vessel with the liquid-holder respectively, said pipes being rigidly attached to the air-holder by the same plug or stuffing-box on its top and the liquid-pipe attached also to the bottom of the air-holder by a plug or stuffing-box connecting the air and liquid holders, said latter plug constituting a bung for the liquid-holder, all substantially as described, to strengthen the air-reservoir, support it on the top of liquid-holder, and adapt the devices for easy connection with an ordinary cask or barrel.

In testimony whereof I have signed this specification in the presence of two subscribing witnesses.

MARTIN V. TEETOR.

Witnesses:
E. J. WHITTLETON,
C. K. KNAPP.